Oct. 18, 1966 L. H. LEONARD, JR 3,279,203
ABSORPTION REFRIGERATION SYSTEMS HAVING WEAK AND STRONG
SOLUTION PUMPS WITH MEANS FOR BYPASSING SOLUTION TO
THE INLET OF THE STRONG SOLUTION PUMP
Filed Dec. 8, 1964
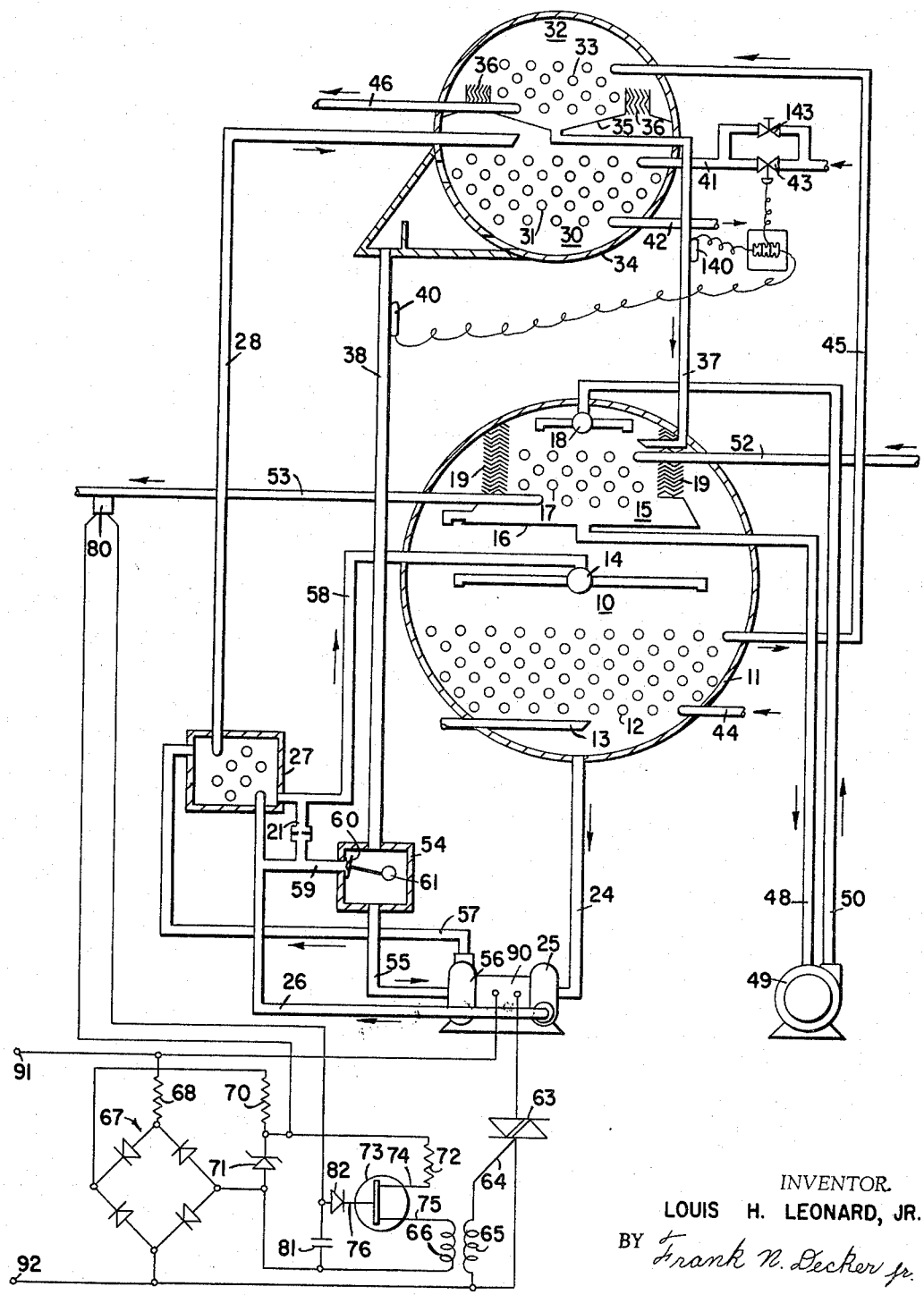
INVENTOR.
LOUIS H. LEONARD, JR.
BY Frank N. Decker jr.
ATTORNEY.

United States Patent Office 3,279,203
Patented Oct. 18, 1966

3,279,203
ABSORPTION REFRIGERATION SYSTEMS HAVING WEAK AND STRONG SOLUTION PUMPS WITH MEANS FOR BYPASSING SOLUTION TO THE INLET OF THE STRONG SOLUTION PUMP
Louis H. Leonard, Jr., De Witt, N.Y., assignor to Carrier Corporation, Syracuse, N.Y., a corporation of Delaware
Filed Dec. 8, 1964, Ser. No. 416,767
7 Claims. (Cl. 62—103)

This invention relates to absorption refrigeration systems and more particularly relates to an absorption refrigeration machine of the type using a first pump to pass weak solution from the absorber to the generator and a second pump for passing strong solution from the generator to the absorber.

An absorption refrigeration system of the type to which this invention is applicable may employ a hydroscopic salt such as lithium bromide dissolved in water as an absorbent solution and may use water as a refrigerant. Such machines employ an absorber for absorbing refrigerant vapor, an evaporator for evaporating refrigerant liquid to provide chilled water, a generator for concentrating absorbent solution which is diluted by absorption of refrigerant vapor in the absorber, and a condenser for condensing refrigerant vapor vaporized from the absorbent in the generator. Weak solution is passed from the absorber by a weak solution pump to the generator for concentration therein. Strong solution is passed by a strong solution pump from the generator to the absorber for absorption of refrigerant vapor therein.

Cooling water from a suitable source such as a cooling tower is passed through heat exchange tubes in the absorber to remove the heat of condensation and dilution from absorbent solution and is then passed through the condenser to remove the heat of vaporization of refrigerant therein to condense the refrigerant. The cooling water is then passed back to the cooling tower where the heat picked up from the machine is rejected to the atmosphere. In a machine of the type described, the cooling water may be permitted to fluctuate without controlling the lowest temperature to which the cooling water drops. The condensed refrigerant is returned from the condenser to the evaporator for reevaporation therein and the concentrated absorbent solution is returned from the generator to the absorber for reabsorption of refrigerant vapor.

Control over the capacity of the absorption machine is preferably achieved by varying the speed of the weak and strong solution pumps although other means of controlling the machine may be provided if desired. Also, and overconcentration control is preferably provided to prevent overconcentration of strong solution in the generator, thus preventing solidification of the strong solution at undesired locations in the machine.

Such a system, as described above, possesses the very substantial advantage, that the temperature of the cooling water need not be controlled, thus eliminating the expense of the usual thermostatically actuated cooling tower bypass valve and the usual condensing temperature control. The system also has the advantage of eliminating the expense of solution control valves. In addition, the heat exchanger may be made more efficient and of smaller size, thus reducing the cost of the absorbent solution charge for the machine because the strong solution is pumped through the heat exchanger instead of returned by gravity from the generator. Also, the strong solution pump permits better heat transfer in the heat exchanger by increasing the strong solution velocity and thus improving the heat transfer coefficient in the heat exchanger.

While the advantages enumerated above render the use of the system described highly advantageous, the employment of a strong solution pump may occasionally give rise to certain problems. For example, if the quantity of solution in the generator is relatively low, there may be insufficient solution head at the suction of the strong solution pump to prevent flashing or cavitation. Not only is cavitation of the pump highly undesirable, because of its destructive effect on the pump impeller, but in addition the noise produced by flashing and cavitation of strong solution is highly objectionable from the standpoint of the owner of the absorption machine. Another problem which may occur is lack of sufficient strong solution to properly wet the entire absorber tube bundle, when the solution flow in the absorption machine is low.

Accordingly, it is a principal object of this invention to provide an improved absorption refrigeration machine and method of operating the same which overcomes the disadvantages enumerated above.

These and other objects of this invention are achieved in the illustrated preferred embodiment thereof by providing an absorption refrigeration machine having an absorber, an evaporator, a generator and a condenser connected to provide refrigeration. A weak solution passage having a weak solution pump therein passes solution from the absorber to the generator for concentration therein. A strong solution passage having a strong solution pump therein passes solution from the generator to the absorber for absorption of refrigerant vapor therein. A bypass passage is provided between the discharge of the weak solution pump and the inlet of the strong solution pump. A suitable float actuated valve responsive to the level of solution in a float chamber provided in the strong solution line, opens the bypass passage to admit weak solution into the inlet of the strong solution pump whenever the conditions of operation of the machine are such that insufficient strong solution is available to prevent cavitation and flashing in the strong solution pump or when additional solution is required to wet the absorber tube bundle.

This invention will be more readily understood from the following detailed description and with reference to the attached drawing wherein the figure is a schematic view, partly in cross-section, showing an embodiment of an absorption refrigeration machine employing this invention.

Referring particularly to the drawing, there is shown a typical absorption refrigeration machine comprising an absorber section 10 within a shell 11. A plurality of heat exchange tubes 12 are provided within the absorber section. A purge line 13 leads from the absorber and conducts noncondensible gases therefrom to a suitable purge unit (not shown). A spray header 14 is located above the absorber section.

Also disposed in shell 11 is an evaporator section 15 comprising a pan-like member 16 within which is disposed a plurality of heat exchange tubes 17. A spray header 18 is located above heat exchange tubes 17 for distributing refrigerant thereover. Evaporator section 15 is in open communication with absorber section 10 through eliminators 19 which prevent entrained liquid refrigerant particles from being carried from evaporator 15 into absorber 10.

In operation, a suitable refrigerant is sprayed over tubes 17 in evaporator section 15 and a suitable absorbent solution is sprayed over tubes 12 in absorber section 10. Liquid refrigerant is vaporized in evaporator section 15 and passes through eliminators 19 into absorber section 10 where the refrigerant vapor is absorbed by the absorbent solution. The vaporization of the refrigerant in evaporator section 15 absorbs heat from the fluid passing through heat exchange tubes 17 and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid to be chilled passing through heat exchange tubes 17. A weak solution line 24 leads from a lower portion of absorber section 10 containing weak solution and pump 25 serves to pass the weak solution through line 26 and solution heat exchanger 27 through line 28 to generator section 30.

As used herein, the term "strong solution" refers to an absorbent solution strong in absorbing power and the term "weak solution" refers to absorbent solution weak in absorbing power. A suitable absorbent for a refrigeration system of the type described comprises a hygroscopic aqueous salt solution such as lithium bromide and water; a suitable refrigerant is water.

The absorption of refrigerant vapor by absorbent solution in absorber section 10 dilutes the absorbent solution and diminishes the refrigerant supply. In order to maintain the refrigeration machine in operation, it is necessary to concentrate this weak solution by separating it from the absorbed refrigerant. For this purpose, a generator section 30 and a condenser section 32 are provided.

Generator section 30 is located in shell 34 and comprises a plurality of heat exchange tubes 31 for passing steam or other heating fluid. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

Refrigerant line 37 leads from pan-like member 35 to evaporator section 15 and serves to return condensed refrigerant from the condenser section to the evaporator section. Strong solution passes from generator section 30 through a strong solution line 38 to a float chamber 54. The strong solution is forwarded from float chamber 54 through line 55, strong solution pump 56, and line 57 to heat exchanger 27. Heat exchanger 27 serves to pass relatively hot, strong absorbent solution from the generator section in heat exchange relation with relatively cool, weak solution being forwarded to the generator for concentration therein. The cooled strong solution is passed to absorber 10 from heat exchanger 27 through line 58.

A bypass line 59 is provided between weak solution line 26, into which pump 25 discharges, and float chamber 54, which empties into the inlet of pump 56. Float valve 60 is actuated by float 61 and admits solution into chamber 54 when the level of solution therein drops below a predetermined level.

A recirculation line and pump (not shown) may be employed to recirculate solution in the absorber but its use is not required because adequate distribution of solution may be provided by pump 56. Instead of employing a recirculation pump, it is preferred to provide a restricted bypass passage 21 to increase the quantity of solution sprayed over tubes 12 in absorber 10.

Inlet line 41 and outlet line 42 are provided to conduct a heating medium such as steam or hot water through heat exchange tubes 31, in order to concentrate the weak solution by boiling off of refrigerant vapor therefrom. A control valve 43 is provided in line 41 to control the supply of heating medium to the generator. The refrigerant vaporized in generator 30 passes through eliminators 36 and is condensed in condenser 32. A cooling water inlet line 44 is connected to heat exchange tubes 12 in absorber section 10 from which the cooling water passes through line 45 and heat exchange tubes 33 in the condenser section. The cooling water is then discharged through line 46. The cooling water serves to remove the heat of dilution and condensation from the absorbent solution in absorber section 10 and serves to remove the heat of vaporization to condense refrigerant vapor in condenser section 32.

A suitable refrigerant recirculation line 48 and recirculation pump 49 pass refrigerant from pan 16 of the evaporator section through line 50 to spray header 18 so that refrigerant may be sprayed over heat exchange tubes 17 to wet them and aid in evaporation of refrigerant and cooling of heat exchange tubes 17. Entering line 52 and leaving line 53 are provided to conduct a heat exchange fluid to be cooled, such as water, through heat exchange tubes 17 to cool the fluid by the resulting heat exchange with the evaporating refrigerant in evaporator 15. This cooled heat exchange fluid is passed through line 53 to suitable remotely located heat exchangers (not shown) to provide cooling in the desired areas.

In accordance with this invention, weak solution pump 25 and strong solution pump 56 are preferably disposed on a common shaft and are driven by a single alternating current motor 90 which is connected to a source of alternating current such as power line terminals 91, 92 through a switch 63. Switch 63 may desirably be a bidirectional gated solid state switch of a type sold under the trademark "Triac." Switch 63 is provided with a gate 64 connected to the secondary winding 65 of a pulse transformer which triggers the switch to a conducting state by applying either a positive or negative pulse to gate 64. Switch 63 should be sufficiently fast in operating so that it may be switched on and off during that portion of each half cycle of alternating current supplied to motor 90, to provide a desired average power so that the motor speed and consequent speed of the pumps is varied in accordance with the capacity demand on the absorption machine.

A control circuit is provided to control the operation of switch 63 in accordance with the desired capacity of the absorption machine. As shown in the drawing, a full-wave diode rectifier circuit 67 is connected in series with a dropping resistor 68 to provide a source of D.-C. voltage across a series connected resistor 70 and Zener diode 71. It will be appreciated that Zener diode 71 has a variable resistance characteristic such that it provides a constant voltage drop across its terminals.

A series circuit comprising unijunction transistor 73 having one base 74 connected in series with resistor 72 and another base 75 connected in series with the primary winding 66 of the pulse transformer is connected across Zener diode 71 which provides a constant voltage to the series circuit.

A temperature sensitive resistance element, such as thermistor 80, is connected in series with a charging capacitor 81 across the constant voltage provided by Zener diode 71. Thermistor 80 is preferably secured to leaving chilled water line 53 to sense the refrigeration load on the absorption machine by sensing the chilled water temperature. Unijunction transistor 73 has an emitter 76 connected through a diode 82, which prevents leakage current from charging capacitor 81, to a junction between thermistor 80 and charging capacitor 81. It may be desirable in practice to add various additional circuits to prevent spurious gating of switch 63. Also, it is desirable to employ a high resistance motor rotor in motor 60, having a resistance tailored to the control circuit for best operation.

It will be apreciated that the circuit shown is illustrative generally of a phase control type of motor speed control. The control circuit shown merely illustrates one type of motor speed control system and other types of motor speed control can be used instead.

In operation, switch 63 is in a nonconducting state and motor 90 is deenergized until a pulse is applied to gate 64. A charge builds up on charging capacitor 81 at a rate which is determined by the resistance of thermistor 80, which in turn is a function of the chilled water temperature in line 53. When the charge on capacitor 81 reaches a predetermined value, unijunction transistor 73 becomes conducting and the charge on capacitor 81 is discharged through primary winding 66 of the pulse transformer. When capacitor 81 discharges, a pulse is induced in secondary winding 65 of the pulse transformer which is applied to gate 64 of switch 63 causing the switch to conduct.

Switch 63 is preferably a solid state device having the characteristic that once it is turned on by a pulse being applied to gate 64, it remains in the conducting state until the voltage across the device becomes negligible. Consequently, switch 63 remains conducting after a pulse is applied to gate 64 until the end of the half cycle of alternating current during which it begins conducting. The valve of the electrical components are chosen so that switch 64 is turned on for a time during each half cycle by the control circuit such that the power supplied to motor 60 is just sufficient to rotate pumps 25 and 56 at a speed which provides the desired solution flows and, consequently, the desired refrigeration capacity. The resistance range of thermistor 80, is chosen so that as the leaving chilled water temperature in line 53 increases, indicating an increased refrigeration load, the resistance of the thermistor decreases and capacitor 81 charges more rapidly. Consequently, switch 63 is turned on for a greater period of time during each half cycle of alternating current, thus increasing the speed of motor 90 and pumps 25 and 56 to provide greater solution flows between absorber 10 and generator 30. The additional solution flow to generator 30 and the increased return of strong solution through line 38 provides increased refrigeration capacity to compensate for the increased load and to reduce the chilled water temperature down to the desired temperature.

It is desirable to prevent overconcentration of strong solution in generator 30 to prevent crystallization of strong solution when cooled in heat exchanger 27. Overconcentration might occur during periods of relatively light load when pump 25 operates at a relatively low speed and passes only a relatively small quantity of weak solution to generator 30. For this purpose, valve 43 is provided in line 41 which supplies heating medium to the generator. The heating medium may be steam, hot water, hot gas, or any other hot fluid. Valve 43, may be a simple, inexpensive shutoff valve because as long as there is strong absorbent solution in the generator, the capacity of the machine can be controlled by varying the speed of pump 25, even where heat is not being supplied to the generator. Preferably, valve 43 is connected to a suitable control responsive to the differential temperature between strong solution temperature in line 38 sensed by bulb 40 and the condensing temperature in condenser 32, sensed by bulb 140 on refrigerant line 37. A manual valve 143 may be employed to bypass a relatively small fixed quantity of heating medium around valve 43 to keep the solution in generator 30 warm. Bulbs 40 and 140 cause valve 43 to close and reduce the supply of heating medium to generator in the event that the difference in temperatures becomes excessive. Conversely, valve 43 opens when the difference in temperatures drops. If desired, valve 43 may be of the modulating type and bypass valve 143 may be eliminated. This type of control is particularly advantageous with a system having an uncontrolled low cooling water temperature in smoothing out the operation of the machine because it compensates for changes in cooling water temperature.

It will be appreciated that if the strong absorbent solution in the generator is sufficiently concentrated, or if the generator is sufficiently warm to continue concentrating solution, it is not necessary for valve 43 to open, and the rise in chilled water temperature may be compensated for by the control system increasing solution flow.

Alternatively, valve 43 may be responsive to any suitable condition of operation of the system, such as strong solution temperature in line 38 or the temperature of leaving chilled water in line 53 as a means of preventing overconcentration of the strong solution.

In operation, pumps 25 and 56 are designed to provide a balanced solution flow to and from the generator under conditions of the heaviest refrigeration load which will be imposed on the machine. When the chilled water temperature in line 53 drops, indicating a reduced load, the speed of pumps 25 and 56 will be reduced by the same amount and the solution flows to and from the generator will both be proportionally reduced. Thus, the tendency of stacking up excessive solution in the generator and starving of the generator when controlling solution flow is reduced. Furthermore, should insufficient solution head be available in line 55 to prevent cavitation of pump 56, float valve 60 will open to supply the required excess solution. By employing float chamber 54 in the manner described, not only is cavitation of pump 56 prevented, but also the undesirable noise produced under conditions of low suction head is reduced.

Under some conditions, sufficient solution might not be available to properly wet tubes 12 with strong solution alone, but restricted bypass line 21 will pass sufficient solution to line 58 to insure proper wetting of the tubes.

While it is preferred to drive pumps 25 and 56 with a single motor, for purposes of economy, it is within the scope of this invention to use separate motors for driving the pumps. In that event, either or preferably both of pumps 25 and 56 should be provided with appropriate speed controls. An advantage, however, of using the preferred embodiment is that absorbent solution is on both sides of the motor so that bearing lubrication and motor cooling is facilitated. Also any leakage of solution from one pump to the other has only a negligible effect on the performance of the refrigeration system.

By passing a small amount of absorbent solution through restricted bypass passage 21 from the discharge of pump 25 into line 58 the quantity of solution supplied to spray header 14 can be increased. It will be noted, however, that the bypass solution passing through line 21 does not pass through the heat exchanger so that advantage is taken of the maximum possible temperature difference between strong and weak solution in the heat exchanger for optimum heat transfer.

By employing a bypass passage and float chamber in accordance with this invention, the previously described problems of flashing and pump cavitation are greatly reduced. Flashing is also undesirable in an absorption refrigeration machine because of the excessive noise level which is generated by the flashing. It will be apparent that this noise problem is also overcome by the practice of this invention. Furthermore, by passing some weak solution into the inlet of the strong solution pump, the quantity of solution distributed by spray header 14 over absorber tubes 12 is increased during periods of operation when the strong solution flow might be insufficient to adequately wet the tube bundle for maximum machine efficiency. Under these conditions the level of solution in chamber 54 will drop and float valve 60 will open to pass weak solution to pump 56.

It will be noted that by the practice of this invention an absorbent recirculation line in the absorber is unnecessary because sufficient solution can be always made available to spray header 14 to provide the desired wetting of the tube bundle.

Various modifications of this invention will occur to those skilled in the art. It will be appreciated therefore, that there is shown and described a preferred embodiment of the invention and that it may be otherwise embodied within the scope of the following claims.

I claim:

1. An absorption refrigeration machine comprising an absorber, a condenser, a generator, and an evaporator connected by passages to provide refrigeration; a first pump in a strong solution passage for forwarding strong solution from said generator to said absorber; a second pump in a weak solution passage for forwarding weak solution from said absorber to said generator; solution passage means extending from the discharge of said second pump to the inlet of said first pump; and valve means for automatically opening said solution passage upon the existence of an insufficient supply of strong solution at the inlet of said first pump to admit weak absorbent solution into the inlet of said first pump in an amount sufficient to prevent substantial cavitation thereof.

2. An absorption refrigeration machine comprising an absorber, a condenser, a generator, and an evaporator connected by passages to provide refrigeration; a first pump in a strong solution passage for forwarding strong solution from said generator to said absorber; a second pump in a weak solution passage for forwarding weak solution from said absorber to said generator; a float chamber in said strong solution passage between said generator and said first pump; a bypass passage extending between the discharge of said first pump and said float chamber; a float valve controlling the passage of solution through said bypass passage into said float chamber responsive to the level of solution in said float chamber, so as to admit weak absorbent solution automatically into said float chamber when the level of solution therein drops below a predetermined level.

3. An absorption refrigeration machine adapted to contain an absorbent solution and having a generator, a condenser, an absorber and an evaporator connected to provide refrigeration, said absorption machine including: weak solution passage means for forwarding weak absorbent solution from said absorber to said generator for concentration therein; strong solution passage means for forwarding strong absorbent solution from said generator to said absorber for absorption of refrigerant vapor therein; a weak solution pump in said weak solution passage means to forward solution therethrough; a strong solution pump in said strong solution passage to forward strong solution therethrough; means to vary the speed of said strong solution pump and said weak solution pump in response to the refrigeration load imposed on said system; a bypass passage extending between the discharge of said weak solution pump and the inlet of said strong solution pump; and valve means to open said bypass passage automatically upon the existence of insufficient strong solution at the inlet of said strong solution pump.

4. An absorption refrigeration machine comprising an absorber, an evaporator, a generator, a condenser, and a solution heat exchanger connected to provide refrigeration, said machine having a first weak solution passage connecting said absorber with a weak solution section of said heat exchanger; a second weak solution passage connecting said weak solution section of said heat exchanger with said generator; a weak solution pump in said first weak solution line to pass weak solution from said absorber, through said heat exchanger, to said generator; a first strong solution passage connecting said generator with a strong solution section of said heat exchanger; a second strong solution passage connecting the strong solution section of said heat exchanger with said absorber; a strong solution pump in said first strong solution passage to pass strong solution from said generator through said heat exchanger to said absorber; and means to pass weak absorbent solution from the discharge of said weak solution pump into the inlet of said strong solution pump, said means comprising a bypass passage connecting said first weak solution passage at a point between the discharge of said weak solution pump and said heat exchanger with said first strong solution passage at a point between said generator and said strong solution pump to pass weak solution into the inlet of said strong solution pump.

5. An absorption refrigeration machine comprising an absorber, an evaporator, a generator, a condenser, and a solution heat exchanger connected to provide refrigeration, said machine having a first weak solution passage connecting said absorber with a weak solution section of said heat exchanger; a second weak solution passage connecting said weak solution section of said heat exchanger with said generator; a weak solution pump in said first weak solution line to pass weak solution from said absorber, through said heat exchanger, to said generator; a first strong solution passage connecting said generator with a strong solution section of said heat exchanger; a second strong solution passage connecting the strong solution section of said heat exchanger with said absorber; a strong solution pump in said first strong solution passage to pass strong solution from said generator through said heat exchanger to said absorber; a first bypass passage connecting said first weak solution passage at a point between the discharge of said weak solution pump and said heat exchanger with said first strong solution passage at a point between said generator and the inlet of said strong solution pump to pass weak solution into the inlet of said strong solution pump; and a second bypass passage connecting said first weak solution passage at a point between the discharge of said pump and said heat exchanger with said second strong solution passage at a point between said heat exchanger and said absorber to pass a quantity of weak solution from the discharge of said weak solution pump into said second strong solution passage to mix with strong solution passing from said heat exchanger to said absorber subsequent to the passage of said strong solution through said heat exchanger.

6. In a method of operating an absorption refrigeration machine, said absorption machine having an absorber, an evaporator, a condenser, a generator and a heat exchanger having a weak solution passage and a strong solution passage connected to provide refrigeration and adapted to contain an absorbent solution; the steps comprising: pumping weak absorbent solution from said absorber through the weak solution passage in said heat exchanger to said generator by means of a weak solution pump; pumping strong absorbent solution from said generator through the strong solution passage in said heat exchanger to said absorber by means of a strong solution pump; and automatically bypassing weak solution from the discharge of said weak solution pump to the inlet of said strong solution pump prior to the passage of the bypassed weak solution through said heat exchanger to reduce cavitation thereof.

7. In a method of operating an absorption refrigeration machine, said absorption machine having an absorber, an evaporator, a condenser, and a generator connected to provide refrigerant and adapted to contain an absorbent solution; the steps comprising: pumping weak absorbent solution from said absorber to said generator through a weak solution passage by means of a weak solution pump; pumping strong absorbent solution from said generator to said absorber through a strong solution passage by means of a strong solution pump; varying the speed of said pumps in response to the load imposed on said machine to control the capacity of said machine; and automatically passing solution from the discharge of said weak solution pump to the inlet of said strong solution pump when the quantity of strong solution at said inlet is insufficient to prevent cavitation of said pump.

References Cited by the Examiner
UNITED STATES PATENTS 3,053,056 9/1962 Leonard _____ 62—148
3,126,720 3/1964 Stubblefield _____ 62—476 X LLOYD L. KING, Primary Examiner.